Sept. 30, 1924.
B. C. SMITH
VEHICLE BRAKE
Filed Sept. 12, 1923
1,510,347
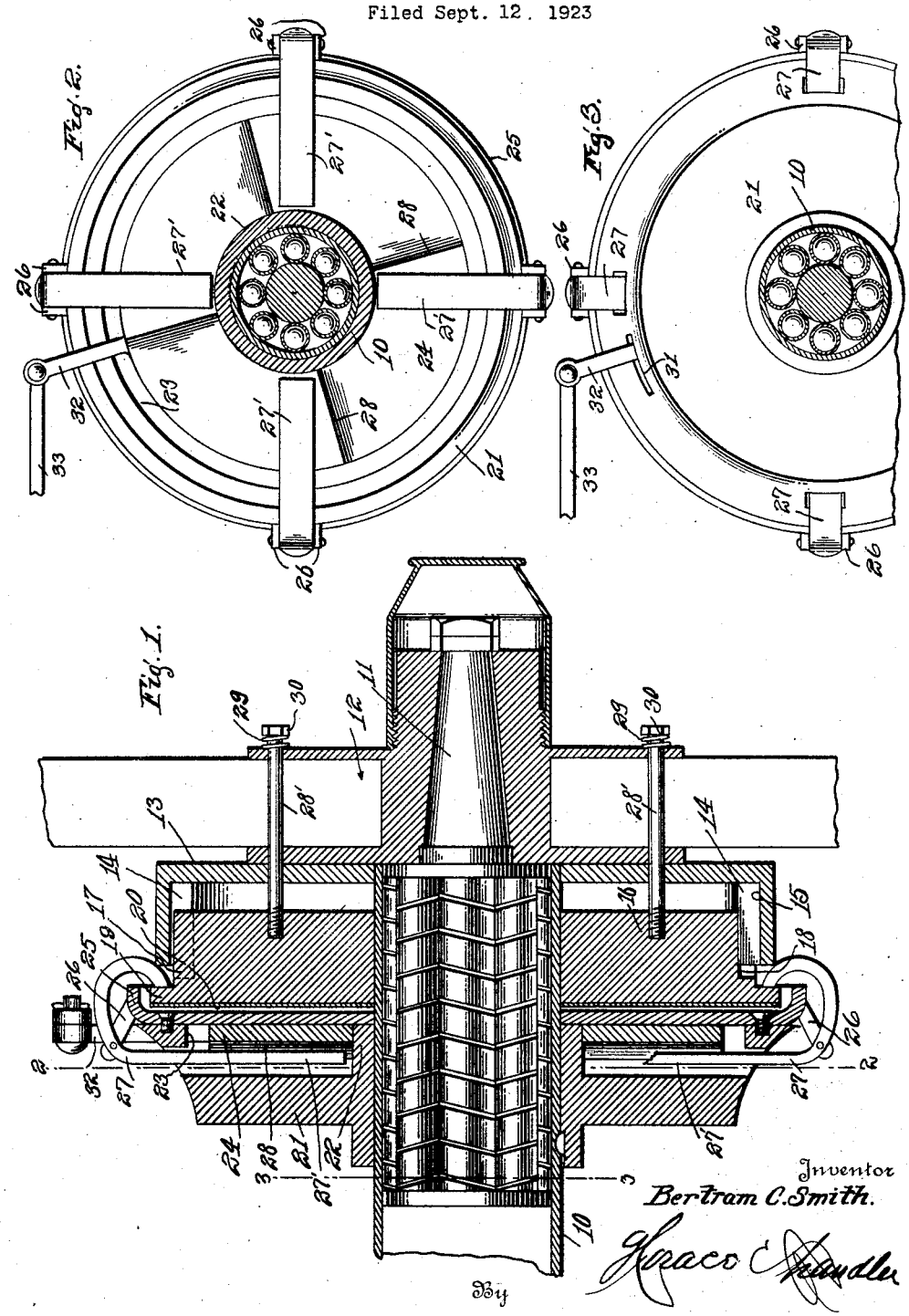
Inventor
Bertram C. Smith.
By
Attorney Patented Sept. 30, 1924.

1,510,347

UNITED STATES PATENT OFFICE.

BERTRAM C. SMITH, OF RED LION, PENNSYLVANIA.

VEHICLE BRAKE.

Application filed September 12, 1923. Serial No. 662,289.

*To all whom it may concern:*

Be it known that I, BERTRAM C. SMITH, a citizen of the United States, residing at Red Lion, in the county of York, State of Pennsylvania, have invented certain new and useful Improvements in Vehicle Brakes; and I do hereby declare the following to be a full, clear, and exact description of the invention, such as will enable others skilled in the art to which it appertains to make and use the same.

This invention relates to new and useful improvements in brakes, and particularly to brakes for automobiles.

One object of the invention is to provide a brake for an automobile which obviates the use of the ordinary brake band.

Another object is to provide a brake for an automobile wherein a larger area of braking surface is present, with the greater effectiveness of the braking power of the device.

Another object is to provide a brake of this character which is simple and durable in construction and operation, and which is capable of being easily and quickly substituted for the ordinary band brake now in use.

Other objects and advantages will be apparent from the following description when taken in connection with the accompanying drawing.

In the drawing:

Figure 1 is a vertical sectional detail view of a brake made in accordance with the present invention.

Figure 2 is a vertical transverse sectional view on the line 2—2 of Figure 1, on a slightly reduced scale from that of Figure 1.

Figure 3 is a vertical transverse sectional view on the line 3—3 of Figure 1, on the same scale as that of Figure 2.

Referring particularly to the accompanying drawing, 10 represents a portion of a rear axle housing of an automobile, within which is disposed the axle 11, carrying the wheel 12 on its outer end. Carried by the inner face of the hub portion of the wheel 12 is a cup-shaped member 13, of a form similar to the ordinary brake drum of the rear wheel of an automobile, and in the inner peripheral face of the flange of this member there are formed the regularly spaced teeth or ribs 14, and the intervening grooves 15. Surrounding the axle housing 10, and slidably into and out of the member or drum 13, is a comparatively thick disk 16, said disk having formed transversely on its peripheral face the ribs 17, and intervening grooves 18, for slidable engagement with the grooves and ribs of the drum, and whereby the said disk is held to the drum for rotation therewith, at all times. A bead or flange 19 is formed on the peripheral face of the disk 16, adjacent the end remote from the drum, and on this end of the disk there is secured a disk of friction material 20, forming the braking surface of the disk. Secured around the housing 10, adjacent the disk 16, is a housing or box 21, the same being formed with a hub portion 22, leaving a recess 23 in the vertical face thereof, and rotatable on this hub portion, within the box 21, is a disk or wheel 24. Secured to the outer face of the box 21 is a shallow cup-shaped member or disk 25, within which the adjacent portion of the disk 16 normally lies, and with which the friction facing 20 is arranged to bear, in the operation of the brake, as will be more clearly explained later herein. It will be noted that the flange of the disk 25 overlies the periphery of the disk 16, so as to exclude dirt and moisture from the braking surface. On the periphery of the box 21, at regularly spaced intervals, are the apertured ears 26, and pivotally supported on each of the ears is the angle of an approximately J-shaped lever 27. The straight leg portion 27', of the lever, is disposed within the box, adjacent and contacting with the face of the wheel or disk 24, while the other or curved end spans the peripheries of the disks and engages its end with the shoulder of the bead or flange 19. The face of the disk 24, which engages with the leg portions 27', of the levers 27, is formed with a series of inclined or cam faces 28, each bearing against a leg 27', and arranged to move said leg, to rock the lever, upon a slight rotation of the disk. Disposed through the hub portion of the wheel 12, are the bolts 28', said bolts also extending through the drum and into the adjacent face of the disk 16. On the outer end of each of the bolts, and bearing against the outer face of the wheel, is a strong coil spring 29, a nut 30 being engaged on the end of the bolt to retain the spring in proper position, and to regulate and maintain the tension thereof. These springs serve to urge the disk 16 into the drum, so that the braking surface 20 will lie out of contact with the disk 25. In the peripheral face of the box 21 there is formed a circumferentially extending slot 31 through which protrudes the arm 32, carried by the disk or wheel 24. Pivotally connected to the outer end of this arm 32 is a link 33, which is arranged to extend to and be connected with an operating lever, not shown, but which will readily be understood as the brake lever.

It will be noted that the urging action of the springs 29 on the disk 16, serves to rock the levers 27, and maintain their leg portions 27' in firm contact with the cam surfaces of the wheel 24, so that there will be no loose motion to cause rattling or chattering noises between the parts. By turning the nuts 30 the tension of the springs 29 may be regulated, and the braking surface maintained at the proper distance from the disk 25.

Normally the parts are as shown in Figure 1, and to apply the brake, the arm 32 is moved by a pull on the link 33, which rotates the wheel 24 on the hub 22, with the result that the cam faces rock the levers 27, and cause their curved ends to move the disk 16 in a direction out of the drum 13, and the friction face 20 into firm contact with the face of the disk 25. As the wheel 24 is rotated the deeper or thicker portions of the cam members of the wheel push the legs 27' and thereby permit the brake to be applied to any degree desired. Upon releasing the pressure or pull on the link 33, the springs 29 will withdraw the disk 16 into the drum 13, and carry the face 20 out of contact with the disk 25, thereby releasing the brake.

Attention is called to the fact that this form of frictional contacting elements provides for a larger area of contacting faces, and that there will be no drag of any portion thereof, when the brakes are off, as is generally experienced in the ordinary band brake. Furthermore the adjusting of the brakes, when the automobile is first equipped, is reduced to a simple operation, and once being adjusted, no further service is necessary, except to renew the friction face 20, when such face wears out.

What is claimed is:

1. In a vehicle brake, an axle carried member, a wheel carried member rotatable with the wheel and movable into and out of engagement with the axle carried member, means for normally holding the wheel carried member out of engagement with the axle carried member, and means for moving the wheel carried member into engagement with the axle carried member.

2. In a vehicle brake, an axle carried member, a wheel carried member movable into and out of contact with the axle carried member, means for normally holding the wheel carried member out of engagement with the axle carried member, and a rotary member carried by the axle for moving the wheel carried member into contact with the axle carried member.

3. In a vehicle brake, an axle carried member, a member slidably carried by the wheel of a vehicle and movable into and out of contact with the axle member, means for normally holding the wheel member out of engagement with the axle member, and means for moving the wheel member into contact with the axle member.

4. In a vehicle brake, an axle carried member, a wheel carried member slidable into and out of engagement with the axle member, the wheel member being rotatable with the wheel, resilient means for normally maintaining the wheel member out of engagement with the axle member, means carried by the axle member and normally engaged with the wheel member for moving the latter in one direction, and a rotary means on the axle member for actuating the axle member carried means.

5. In a vehicle brake, an axle carried disk, a wheel carried disk slidable into and out of contact with the axle disk, levers carried by the axle disk and engaged with the wheel disk, means for normally urging the wheel disk away from the axle disk, and a rotary cam element on the axle disk engaged with the levers and movable to actuate the levers.

6. In a vehicle brake, an axle carried stationary disk, a disk carried by the vehicle wheel and slidable into and out of contact with the axle disk, means for maintaining the disks yieldably out of contact, the slidable disk having a peripheral flange, levers pivotally carried by the stationary disk and constantly engaged with the said flange, and a rotary cam element carried by the stationary disk and in constant engagement with said levers for rocking the levers to move the slidable disk into contact with the stationary disk.

In testimony whereof, I affix my signature.

BERTRAM C. SMITH.